United States Patent
Riesenman

(10) Patent No.: US 6,747,912 B1
(45) Date of Patent: Jun. 8, 2004

(54) IMPLIED PRECHARGE AND POSTED ACTIVATE COMMAND TO REDUCE COMMAND BANDWIDTH

(75) Inventor: Robert J. Riesenman, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/334,809

(22) Filed: Dec. 31, 2002

(51) Int. Cl.$^7$ ................................................. G11C 8/18
(52) U.S. Cl. .................. 365/233; 365/203; 365/230.03; 711/158; 711/167; 711/168
(58) Field of Search ............................. 365/233, 230.03, 365/203, 189.02, 230.02, 238.5; 711/158, 154, 168, 167

(56) References Cited

U.S. PATENT DOCUMENTS

| | | | |
|---|---|---|---|
| 6,269,433 B1 | * | 7/2001 | Jones et al. ............... 711/168 |
| 6,310,814 B1 | * | 10/2001 | Hampel et al. ............. 365/222 |
| 6,470,433 B1 | * | 10/2002 | Prouty et al. ............... 711/168 |
| 6,615,326 B1 | * | 9/2003 | Lin ............................ 711/154 |

* cited by examiner

*Primary Examiner*—Andrew Q. Tran
(74) *Attorney, Agent, or Firm*—Calvin E. Wells

(57) ABSTRACT

A combination precharge/activate command is utilized in order to make more efficient use of a command bus between a memory controller and a system memory. Upon receiving a precharge/activate command from the memory controller, the system memory makes a determination as to how to interpret the command depending on a page status. For an open page, the precharge/activate command is treated as a precharge command and then the system memory performs an activate with proper command timing using address and bank given during precharge/activate command. For a closed page, the precharge/activate command is treated as an activate command.

16 Claims, 3 Drawing Sheets

Figure 1 – Prior Art

IMPLIED PRECHARGE AND POSTED ACTIVATE COMMAND TO REDUCE COMMAND BANDWIDTH

FIELD OF THE INVENTION

The present invention pertains to the field of computer systems. More particularly, this invention pertains to the field of improving memory subsystem performance.

BACKGROUND OF THE INVENTION

Memory subsystems are an important part of today's digital electronic systems, including computer systems. Computer system processors are typically coupled to system memory via a memory controller. Other system components may also access the system memory via the memory controller.

The memory controller communicates with the system memory by way of a variety of signals. At least one clock signal is typically coupled between the memory controller and the system memory. A number of command signals are also coupled between the memory controller and the system memory. Further, a number of address lines and data lines are coupled between the memory controller and the system memory.

The system memory may physically reside on one or more memory modules where each module includes a number of memory devices. The system memory may be logically organized into banks. The system memory may be implemented using synchronous dynamic random access memory (SDRAM) devices.

FIG. 1 is a timing diagram of a typical series of read transactions from system memory. At time T1, the memory controller delivers an activate command (ACT) for a first bank (b1). The activate command is accompanied by a row address (ROWa) on the address lines. At time T3, a read command (READ b1) for the first bank is issued accompanied by a column address (COLa) on the address lines. The data (D0–D3) for this read transaction is returned from the system memory beginning at time T6.

At time T4 the memory controller begins another read transaction by issuing another activate command (ACT) for a second bank (b2) accompanied by a row address (ROWb). The read command (READ b2) for the second bank is issued at time T6 along with a column address (COLb). The data (D0–D3) for this read transaction is returned from the system memory beginning at time T9.

Also at time T9, a precharge command (PRE b1) is issued for the first bank. At time T10, another read command (READ b2) for the second bank is issued along with a column address (COLc). The data (D0–D3) for this read command is returned beginning at time T13.

An activate command (ACT b1) for the first bank follows two clock periods (at time T11) after the precharge command issued at time T9. The activate command is accompanied by a row address (ROWc). Two clock periods following the activate command, a read command (READ b1) is issued for the first bank accompanied by a column address (COLd).

As can be seen by looking at the command stream of FIG. 1, the command signals are very active. It would be desirable to make more efficient use of the command bus and to simplify memory controller command scheduler design.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

In general, one embodiment makes use of a combination precharge/activate command in order to make more efficient use of a command bus between a memory controller and a system memory.

Figure 1:
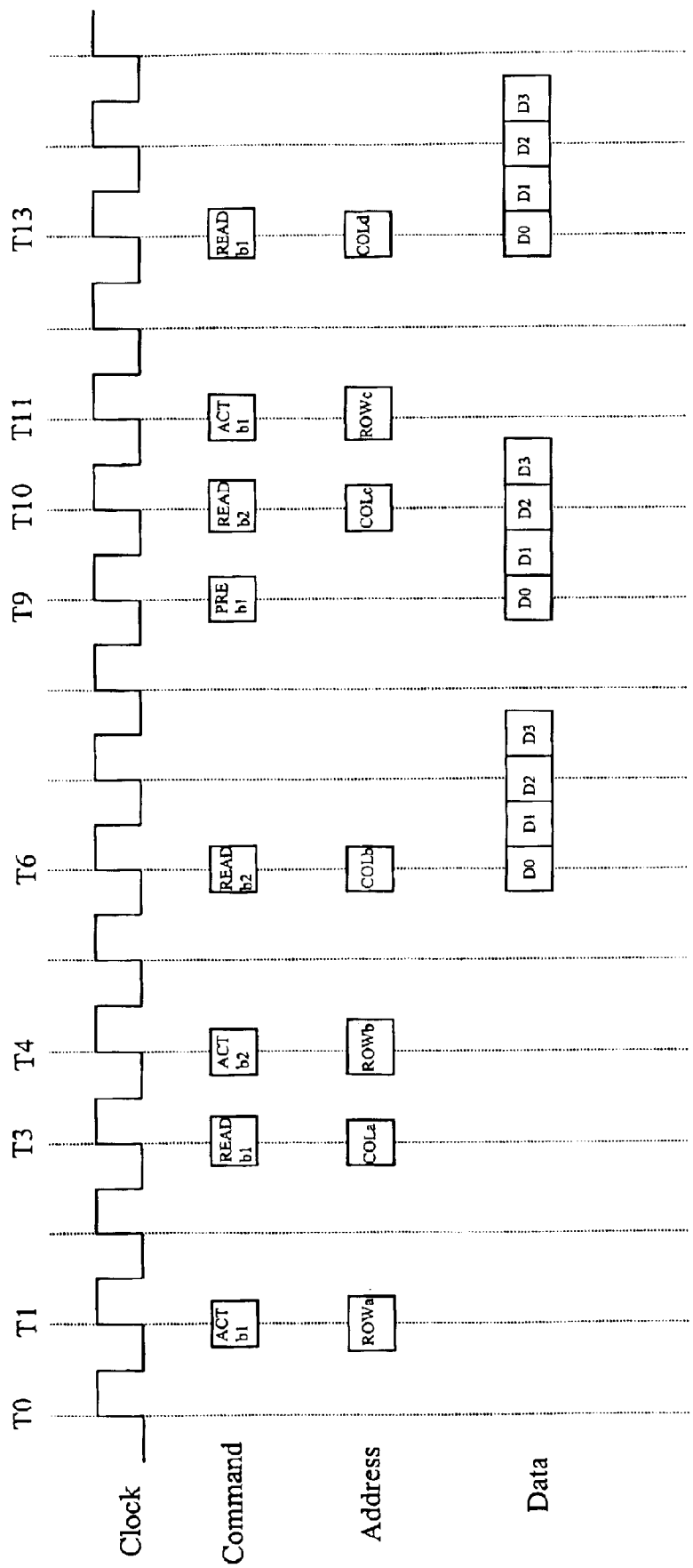
FIG. 1 is a timing diagram of an example prior stream of read transactions.
Figure 2:
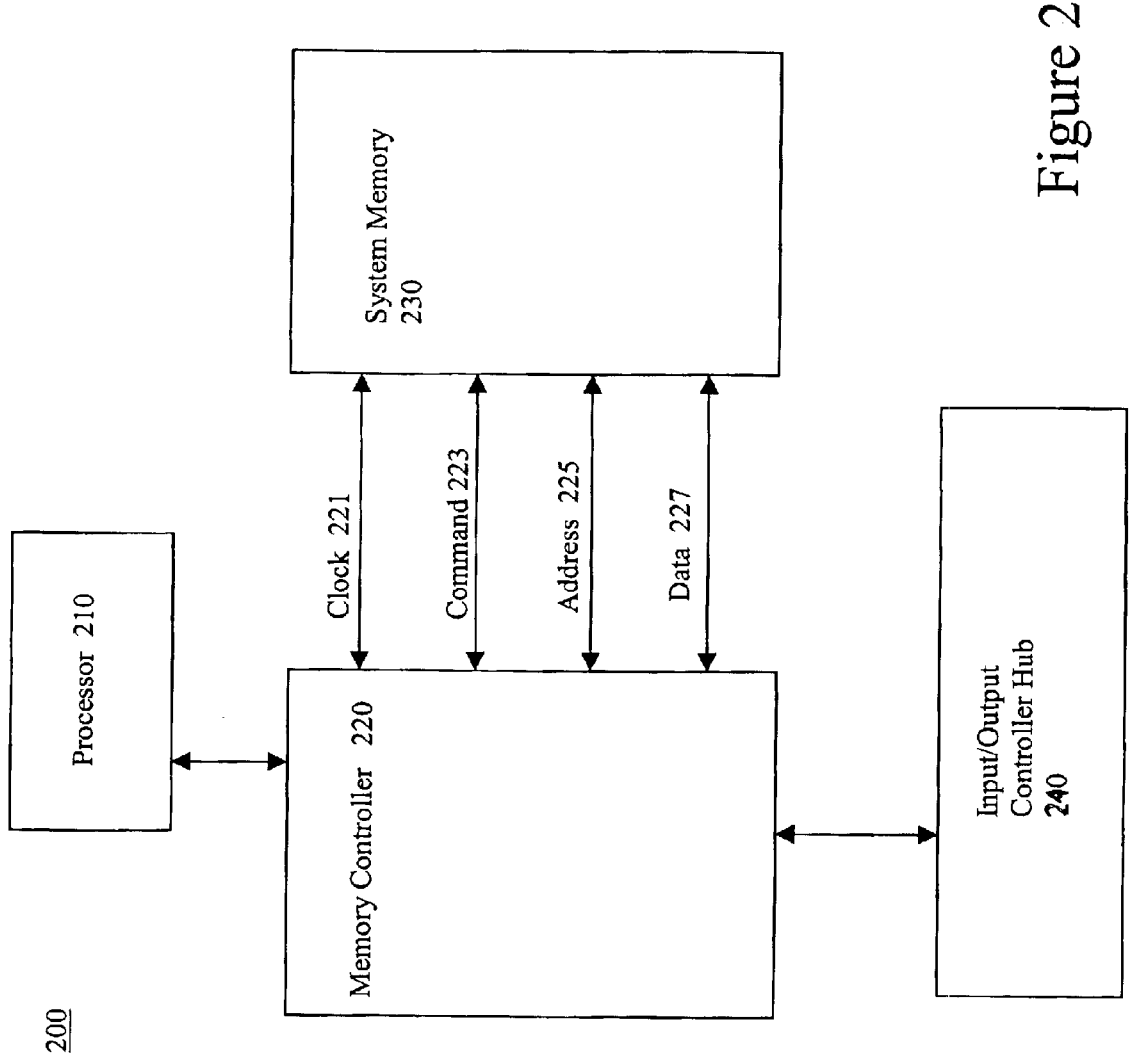
FIG. 2 is a block diagram of a computer system including a memory controller and a system memory.

FIG. 2 is a block diagram of a computer system 200 including a memory controller 220 and a system memory 230. A processor 210 is coupled to the memory controller 220. The memory controller 220 is also coupled to an input/output controller hub 240. The computer system 200 is only one of a wide range of possible computer system configurations. Also, the memory controller 220 and the system memory 230 may be implemented in any of a wide variety of digital devices.

The memory controller 220 communicates with the system memory 230 using a number of signals. For this example embodiment, a clock signal 221 is coupled between the memory controller 220 and the system memory 230. Some embodiments may include more than one clock signal. A number of command signals 223 are also connected between the memory controller 220 and the system memory 230. The number of command signals may vary among different possible embodiments, but the command signals may include a row address strobe, a column address strobe, and a write enable signal, among others.

An address bus 225 and a data bus 227 are also coupled between the memory controller 220 and the system memory 230. The number of address and data lines may vary widely among possible embodiments. One embodiment may use a data bus with a width of 64 bits.

The system memory 230 may be implemented as one or more memory modules where each module may include a number of memory devices. For this example embodiment, the memory devices may be a type of SDRAM.

Some of the interactions between the memory controller 220 and the system memory 230 will be described below in connection with the timing diagram of FIG. 3. In particular, the memory controller 220 communicating both precharge and activate commands using a single combination precharge/activate command will be discussed.

Figure 3:
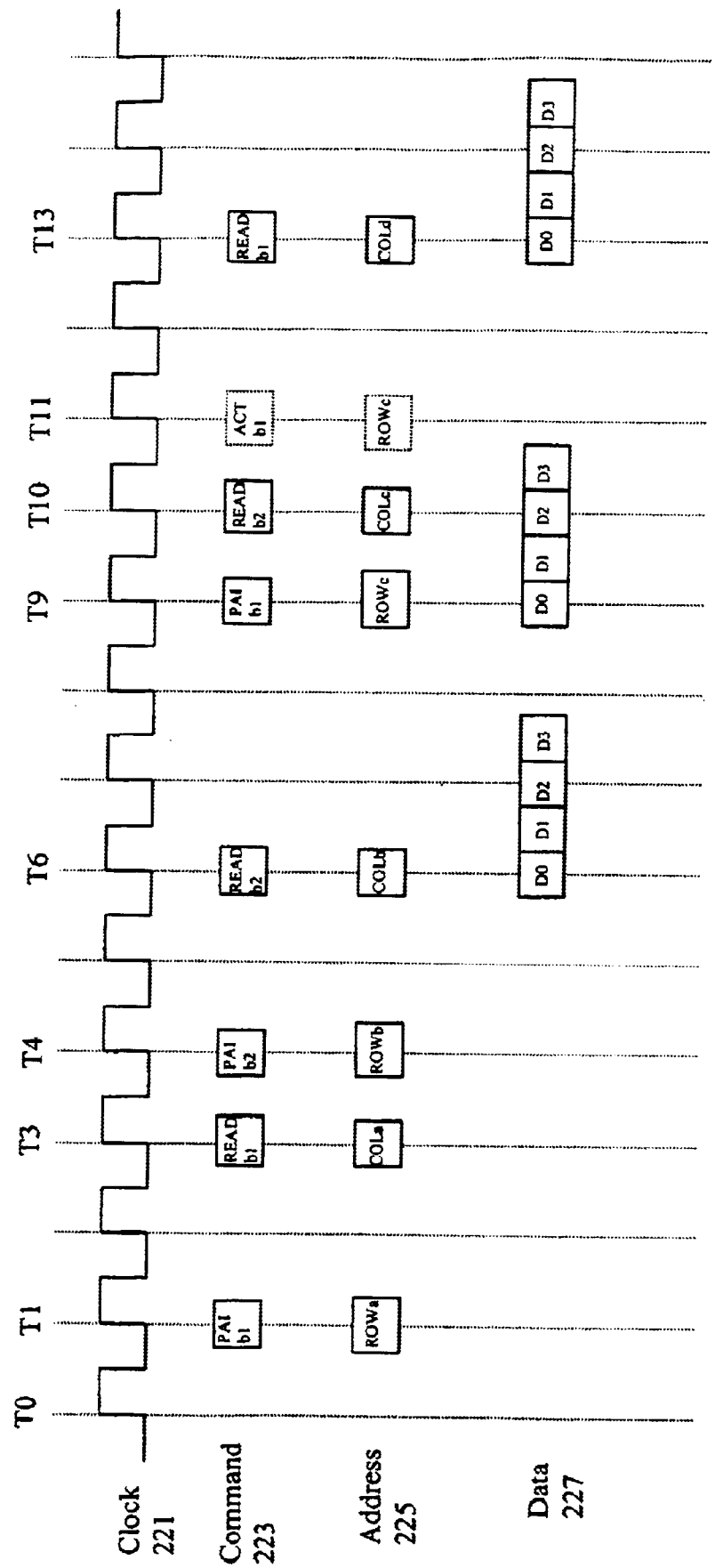
FIG. 3 is a timing diagram demonstrating a combination precharge and activate command.

FIG. 3 is a timing diagram demonstrating the combination precharge and activate command. At time T1, the memory controller 220 delivers a precharge/activate inferred command (PAI) for a first bank (b1). Assuming that each system memory bank is already precharged at time T0, then the system memory 230 will infer from the PAI command and the closed page status of the first bank that the system memory 230 should interpret the PAI command as an activate command.

The PAI command at time T1 is accompanied by a row address (ROWa) on the address lines 225. At time T3, a read command (READ b1) for the first bank is issued accompanied by a column address (COLa) on the address lines 225. The data (D0–D3) for this read transaction is returned from the system memory beginning at time T6.

At time T4 the memory controller begins another read transaction by issuing another PAI command for a second bank (b2) accompanied by a row address (ROWb). Because the banks were already in a precharged state at time T0, the system memory 230 will infer from the PAI command and the closed page status of the second bank that the system memory 230 should interpret the PAI command at time T4 as an activate command. The read command (READ b2) for the second bank is issued at time T6 along with a column address (COLb). The data (D0–D3) for this read transaction is returned from the system memory 230 beginning at time T9.

Also at time T9, an additional PAI is issued for the first bank. Because the page status for bank 1 at time T9 is open, the system memory 230 interprets the PAI command as a precharge command. The system memory 230 also infers from the PAI command and the open page status that an activate command should be executed for the first bank at time T11. The column address that in prior systems would accompany an activation command accompanies the PAI command at time T9. The inferred activate command and row address are shown at time T11 in FIG. 3. The activate command and the row address at time T11 are not issued at that time by the memory controller 220, but are inferred by the system memory 230 from the page status and the PAI command issued at time T11.

At time T10, another read command (READ b2) for the second bank is issued along with a column address (COLc). The data (D0–D3) for this read command is returned beginning at time T13.

Two clock periods following the inferred activate command at time T11, a read command (READ b1) is issued for the first bank accompanied by a column address (COLd).

Although not shown in FIG. 3, the memory controller 220 may issue precharge commands to the system memory 230 in some situations.

In order for the system memory 230 to handle PAI commands appropriately, the system memory 230 will track the page status for each bank. The actions taken by the system memory 230 in response to PAI and precharge commands for this example embodiment are summarized in table 1 below.

| Page Status | Command Issued By Memory Controller 220 | Action Taken by System Memory 230 |
| --- | --- | --- |
| Open | PAI | Treat PAI as a precharge command and then perform an activate with proper command timing using address and bank given during PAI |
| Closed | PAI | Treat PAI as activate |
| Open | Precharge | Close bank |
| Closed | Precharge | Illegal command |

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. A memory controller, comprising:
   a clock signal output;
   a plurality of command signal outputs, the plurality of command signal outputs to deliver a precharge/activate inferred command to a first bank of a memory device at a first clock edge, the precharge/activate inferred command to be interpreted by the memory device as an activate command;
   a plurality of address line outputs, the plurality of address line outputs to deliver a first row address to the memory device at the first clock edge; and
   a plurality of data line outputs.

2. The memory controller of claim 1, the plurality of command signal outputs to deliver a second precharge/activate inferred command to the first bank of the memory device at a second clock edge, the second precharge/activate inferred command to be interpreted by the memory device as a precharge command.

3. The memory controller of claim 2, the memory device to infer from the second precharge/activate inferred command at the second clock edge that an activate command shall be performed for the first bank of the memory device at a time later than the second clock edge.

4. The memory controller of claim 3, the memory device to infer from the second precharge/activate inferred command at the second clock edge that the activate command shall be performed for the first bank of the memory device at a third clock edge that is two clock periods later than the second clock edge.

5. A memory module, comprising:
   a clock signal input;
   a plurality of command signal inputs, the plurality of command signal inputs to receive a precharge/activate inferred command for a first bank of memory at a first clock edge, the precharge/activate inferred command to be interpreted as an activate command;
   a plurality of address line inputs, the plurality of address line inputs to receive a first row address at the first clock edge; and
   a plurality of data line inputs.

6. The memory module of claim 5, the plurality of command signal inputs to receive a second precharge/activate inferred command for the first bank of memory at a second clock edge, the second precharge/activate inferred command to be interpreted as a precharge command.

7. The memory module of claim 6, the memory module to infer from the second precharge/activate inferred command at the second clock edge that an activate command shall be performed for the first bank of memory at a time later than the second clock edge.

8. The memory module of claim 7, the memory module to infer from the second precharge/activate inferred command at the second clock edge that the activate command shall be performed for the first bank of memory at a third clock edge that is two clock periods later than the second clock edge.

9. A system, comprising:
   a processor;
   a system memory device; and a memory controller coupled to the processor and also coupled to the system memory device, the memory controller including
  a clock signal output,
  a plurality of command signal outputs, the plurality of command signal outputs to deliver a precharge/activate inferred command to a first bank of the system memory device at a first clock edge, the precharge/activate inferred command to be interpreted by the memory device as an activate command,
  a plurality of address line outputs, the plurality of address line outputs to deliver a first row address to the system memory device at the first clock edge, and
  a plurality of data line outputs.

10. The system of claim 9, the plurality of command signal outputs to deliver a second precharge/activate inferred command to the first bank of the system memory device at a second clock edge, the second precharge/activate inferred command to be interpreted by the system memory device as a precharge command.

11. The system of claim 10, the system memory device to infer from the second precharge/activate inferred command at the second clock edge that an activate command shall be performed for the first bank of the system memory device at a time later than the second clock edge.

12. The system of claim 11, the system memory device to infer from the second precharge/activate inferred command at the second clock edge that the activate command shall be performed for the first bank of the system memory device at a third clock edge that is two clock periods later than the second clock edge.

13. A method, comprising:
  delivering a precharge/activate inferred command to a first bank of a memory device at a first clock edge, the precharge/activate inferred command to be interpreted by the memory device as an activate command; and
  delivering a first row address to the memory device at the first clock edge.

14. The method of claim 13, further comprising delivering a second precharge/activate inferred command to the first bank of the memory device at a second clock edge, the second precharge/activate inferred command to be interpreted by the memory device as a precharge command.

15. The method of claim 14, further comprising the memory device inferring from the second precharge/activate inferred command at the second clock edge that an activate command shall be performed for the first bank of the memory device at a time later than the second clock edge.

16. The method of claim 15, wherein inferring from the second precharge/activate inferred command at the second clock edge that an activate command shall be performed for the first bank of the memory device at a time later than the second clock edge includes the memory device inferring from the second precharge/activate inferred command at the second clock edge that the activate command shall be performed for the first bank of the memory device at a third clock edge that is two clock periods later than the second clock edge.

* * * * *